United States Patent
Betz et al.

(10) Patent No.: US 9,604,595 B2
(45) Date of Patent: Mar. 28, 2017

(54) END-FITTING TENSIONER FOR A SAFETY BELT SYSTEM

(71) Applicant: TRW Automotive GmbH, Alfdorf (DE)

(72) Inventors: Hans-Peter Betz, Bobingen (DE); Dominik Seitzer, Schwaebisch Gmuend (DE); Karl Ruediger, Weilheim (DE)

(73) Assignee: TRW Automotive GmbH (DE)

( * ) Notice: Subject to any disclaimer, the term of this patent is extended or adjusted under 35 U.S.C. 154(b) by 50 days.

(21) Appl. No.: 14/353,046

(22) PCT Filed: Oct. 22, 2012

(86) PCT No.: PCT/EP2012/004415
§ 371 (c)(1),
(2) Date: Apr. 21, 2014

(87) PCT Pub. No.: WO2013/060440
PCT Pub. Date: May 2, 2013

(65) Prior Publication Data
US 2014/0374527 A1 Dec. 25, 2014

(30) Foreign Application Priority Data
Oct. 27, 2011 (DE) .................. 10 2011 117 055

(51) Int. Cl.
*B60R 22/46* (2006.01)
*B60R 22/195* (2006.01)

(52) U.S. Cl.
CPC ...... *B60R 22/4619* (2013.01); *B60R 22/1952* (2013.01); *B60R 22/1954* (2013.01);
(Continued)

(58) Field of Classification Search
CPC ............ B60R 22/1952; B60R 22/1954; B60R 22/1955; B60R 22/4619; B60R 22/4628;
(Continued)

(56) References Cited

U.S. PATENT DOCUMENTS 3,997,126 A * 12/1976 Karlsson ................. B60R 22/44
185/37
4,084,765 A * 4/1978 Bonnaud .................... 242/375.3
(Continued)

FOREIGN PATENT DOCUMENTS

DE 19641227 4/1997
EP 0581228 2/1994
(Continued)

*Primary Examiner* — Paul N Dickson
*Assistant Examiner* — Timothy Wilhelm
(74) *Attorney, Agent, or Firm* — Tarolli, Sundheim, Covell & Tummino LLP

(57) ABSTRACT

An end fitting tensioner (10) for a seat belt system includes a rotatable belt shaft (12) to which one end (14) of a webbing (16) is fixed, a belt shaft housing (18) in which the belt shaft (12) is supported, a rope reel (36) which is arranged at an axial end of the belt shaft (12) and is connected to the belt shaft (12) in a rotationally fixed manner, as well as a pull rope (41) which is secured by one rope end (45) on the rope reel (36) and can at least partly be wound onto the rope reel (36). The rope reel (36) includes a winding surface (62) for the pull rope (41) that is conically tapered in the axial direction.

15 Claims, 5 Drawing Sheets

(52) U.S. Cl.
CPC ...... *B60R 22/4628* (2013.01); *B60R 22/4633* (2013.01); *B60R 2022/468* (2013.01); *B60R 2022/4642* (2013.01)

(58) Field of Classification Search
CPC ........ B60R 22/4633; B60R 2022/4642; B60R 2022/468
See application file for complete search history.

(56) References Cited

U.S. PATENT DOCUMENTS

| | | | |
|---|---|---|---|
| 4,549,704 A | | 10/1985 | Fohl |
| 5,409,176 A | * | 4/1995 | Kopetzky ............... B60R 22/44 242/375.3 |
| 5,522,564 A | * | 6/1996 | Schmidt et al. .............. 242/374 |
| 5,628,470 A | * | 5/1997 | Ray et al. .................. 242/375.3 |
| 5,676,397 A | | 10/1997 | Bauer |
| 6,302,346 B1 | * | 10/2001 | Brown .................... B60R 22/28 242/371 |
| 7,832,768 B2 | * | 11/2010 | Singer et al. ................ 280/806 |
| 2003/0047931 A1 | * | 3/2003 | Rees et al. .................... 280/806 |

FOREIGN PATENT DOCUMENTS

| | | |
|---|---|---|
| FR | 2532180 | 3/1984 |
| GB | 2191933 | 12/1987 |

\* cited by examiner

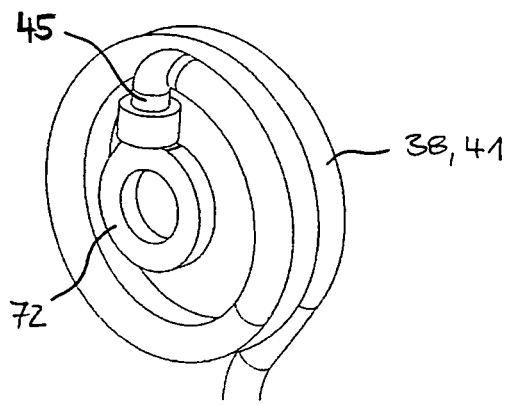
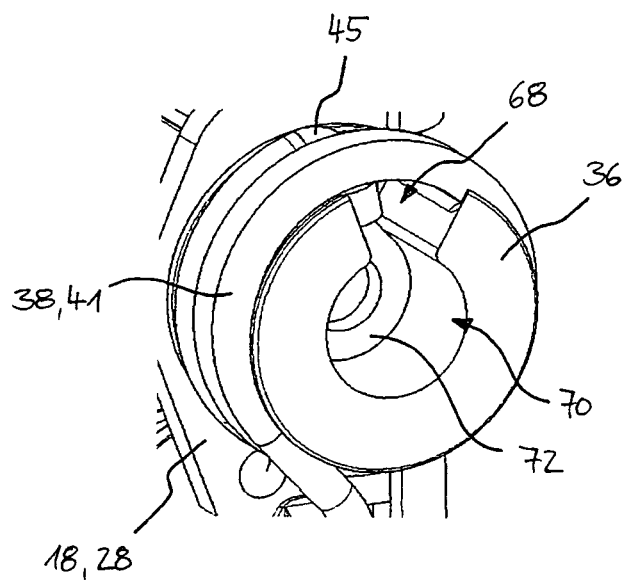
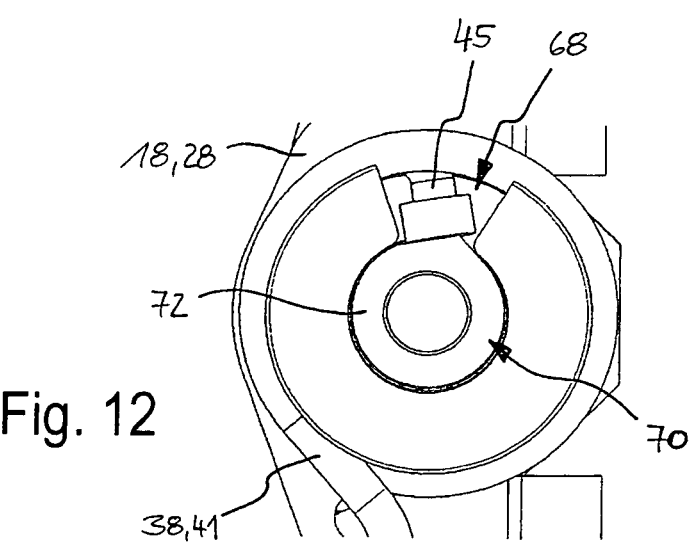

END-FITTING TENSIONER FOR A SAFETY BELT SYSTEM

RELATED APPLICATIONS

This application corresponds to PCT/EP2012/004415, filed Oct. 22, 2012, which claims the benefit of German Application No. 10 2011 117 055.7, filed Oct. 27, 2011, the subject matter, of which are incorporated herein by reference in their entirety.

BACKGROUND OF THE INVENTION

The invention relates to an end fitting tensioner for seat belt systems in vehicles.

Belt tensioners for seat belt systems are generally known already from automotive engineering. In so-called end fitting tensioners in the case of activation of the belt tensioner the actually fixed end of a webbing usually connected to the seat frame or the vehicle body is tightened in order to provide for tensioning of the entire webbing. In the state of the art both linearly operating as well as rotatory end fitting tensioners are described. In the rotatory end fitting tensioners the webbing end is connected to a belt shaft which is driven upon activation of the belt tensioner so as to wind webbing onto the belt shaft.

For driving the belt shaft in the tensioning direction, usually a gas generator is provided for generating a gas pressure after being triggered and thus displacing a piston in a cylindrical tensioner tube along the tube axis. The piston is connected to the belt shaft by a pull rope, for instance, so that the belt shaft is driven in the tensioning direction and belt webbing is wound onto the belt shaft. In the initial state the pull rope is fastened by one rope end to the piston and by an opposite rope end to a rope reel connected to the belt shaft in a rotationally fixed manner and is partly wound onto the rope reel. After activation of the rotatory end fitting tensioner, pull rope is unwound from the rope reel, while the belt shaft rotates, and simultaneously webbing is wound onto the belt shaft so that belt tensioning takes place.

SUMMARY OF THE INVENTION

It is the object of the invention to provide a compact end fitting tensioner which with a comparatively short tensioner tube, i.e. short piston travel, develops both a sufficiently high tensioning force and sufficient webbing retraction.

This object is achieved by an end fitting tensioner for a seat belt system comprising a rotatable belt shaft to which one end of a webbing is fixed, a belt shaft housing in which the belt shaft is supported, a rope reel arranged at an axial end of the belt shaft and being connected, especially in a rotationally fixed manner, to the belt shaft, as well as a pull rope which is secured by one rope end to the rope reel and can at least partly be wound onto the rope reel, the rope reel including a winding surface for the pull rope which is conically tapered in the axial direction. Due to said conical winding surface it is possible to create a desired transmission or reduction and to adjust the ratio of webbing retraction length and tensioning force so that with an unchanged length of the tensioner tube compared to conventional end fitting tensioners increased webbing retraction can be realized. Concretely speaking, the winding surface can substantially correspond to the shell surface of a truncated cone or can alternatively also be bent in the axial direction.

Preferably the rope reel is a cast part, especially made of zinc die cast. This allows almost any shaping of the winding surface as well as of the rope reel as a whole at low manufacturing costs.

In an embodiment of the end fitting tensioner a radius of the winding surface decreases in the axial direction from a first radius to a smaller second radius, wherein the pull rope is fastened in the area of the first radius and is wound onto the rope reel in the direction of the smaller second radius. Thus advantageously at the beginning of the tensioning operation with a set piston travel at first much webbing is retracted with a small piston travel and low tensioning force. In the course of the tensioning operation, by unwinding the pull rope from the conical rope reel the lever arm and thus the torque are increased so that toward the end of the tensioning operation an identical piston travel results in lower webbing retraction while the tensioning force is increased, however. Such webbing tensioning with decreasing webbing retraction and increasing tensioning force has turned out to be extremely advantageous in respect of the occupant safety. At the same time, compared to conventional end fitting tensioners having a substantially cylindrical winding surface of the rope reel, the tensioner tube can be shortened or with equal tensioner tube length more webbing retraction can be realized. The conventional belt tensioners are usually configured so that during the entire tensioning operation comparatively little webbing is retracted with a constantly high tensioning force. Within the scope of the invention, said high tensioning force is reached as late as toward the end of the tensioning operation.

Preferably a tensioner tube for receiving and guiding a pressurizing element, especially a piston, is provided, the pull rope extending from a first rope end secured to the rope reel via at least one winding on the rope reel into the tensioner tube to an opposite second rope end which is secured on the pressurizing element. This very simply structured tensioner drive exhibits high functional safety and via the tapering of the rope reel at the same time allows to adjust a desired transmission or reduction.

In another embodiment of the end fitting tensioner the rope reel and/or the belt shaft housing includes a shear element which prior to activating the end fitting tensioner positively engages in a corresponding recess of the belt shaft housing and/or the rope reel and prevents relative rotation between the rope reel and the belt shaft housing. This rotationally fixed coupling between the rope reel and the belt shaft housing prevents undesired rattling noise from occurring during running. When the belt shaft is moreover fixed, prior to activating the end fitting tensioner, by the shear element in a locked position relative to the belt shaft housing, in a case of restraint without activation of the end fitting tensioner at the same time an advantageous fixation of the webbing end free from play at a vehicle seat or a vehicle body is ensured. Since the rope reel usually is a cast part and the belt shaft housing usually is a sheet metal part especially made of steel sheet, it is suitable to form the shear element integrally with the rope reel and to configure, for instance to cut, the corresponding recess in the belt shaft housing.

Further features and advantages of the invention are evident from the following description of preferred embodiments with reference to the drawings, in which:

BRIEF DESCRIPTION OF THE DRAWINGS

FIG. 10 is a perspective detailed view of a rope reel for the end fitting tensioner according to FIGS. 1 to 4 in the area of a rope end;

FIG. 11 is a perspective detailed view of a rope reel for the end fitting tensioner according to FIGS. 1 to 4 including the pull rope according to FIG. 10; and FIG. 12 is a detailed view of the rope reel according to FIG. 11 in the axial direction.

DESCRIPTION OF EXEMPLARY EMBODIMENTS

Figure 1:
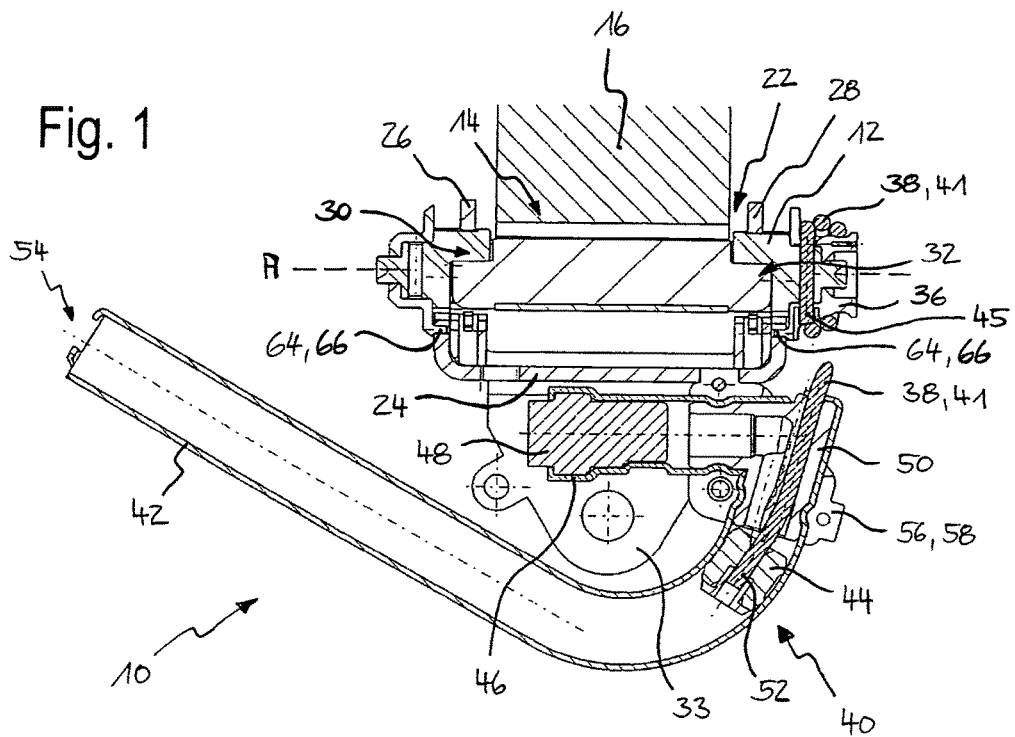
FIG. 1 shows an axial longitudinal section across an end fitting tensioner according to the invention.

FIGS. 1 to 4 illustrate an end fitting tensioner 10 for a seat belt system in a vehicle, comprising a belt shaft 12 to which one end 14 of a webbing 16 is fixed and a belt shaft housing 18 adapted to be fixedly mounted on the body in which the belt shaft 12 is supported, wherein the belt shaft 12 can be rotated relative to the belt shaft housing 18 after activation of the end fitting tensioner 10 so as to wind up webbing 16.

In the shown embodiment, the end 14 of the webbing 16 is stitched to form a loop enclosing a belt shaft inserting element 20, wherein the belt shaft inserting element 20 is received in a recess 22 of the belt shaft 12 and is supported relative to the belt shaft 12 in a rotationally fixed manner.

Figure 2:
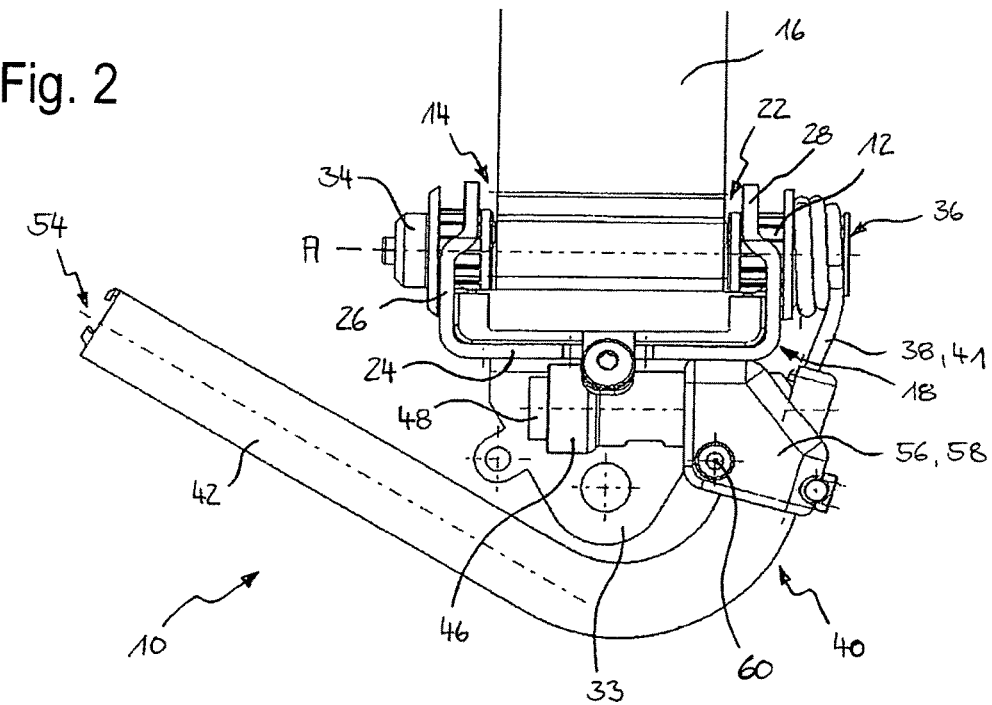
FIG. 2 is a top view of the end fitting tensioner according to FIG. 1.
Figure 3:
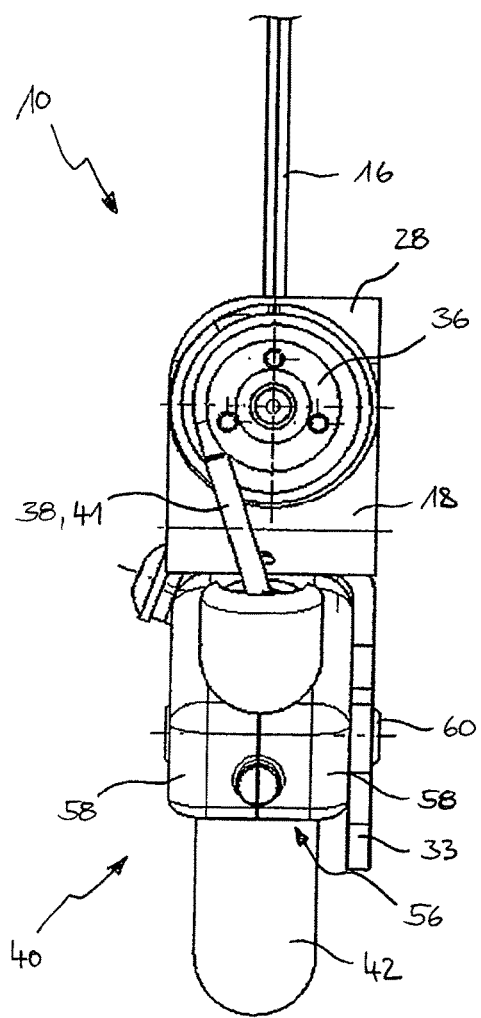
FIG. 3 is a side view of the end fitting tensioner according to FIG. 1.
Figure 4:
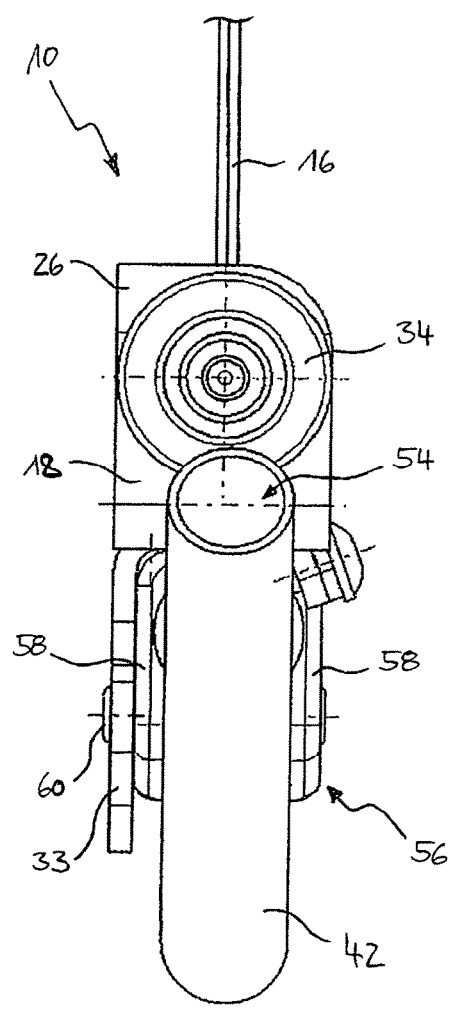
FIG. 4 is another side view of the end fitting tensioner according to FIG. 1.

According to FIG. 2, the belt shaft housing 18 of the end fitting tensioner 10 is U-shaped and comprises a housing land 24 as well as two opposite housing legs 26, 28, each housing leg 26, 28 having a housing aperture 30, 32 through which the belt shaft 12 extends. Furthermore, a securing strap 33 bent from the housing land 24 is provided through which the belt shaft housing 18 can be tightly connected, especially screwed, to a vehicle seat or a vehicle body.

The belt shaft 12 is pivoted about an axis A in the belt shaft housing 18. At the axial ends of the belt shaft 12 an end cover 34 and, resp., a rope reel 36 are disposed, the end cover 34 and the rope reel 36 being tightly connected to, especially pressed with the belt shaft 12 and preventing axial movement of the belt shaft 12 relative to the belt shaft housing 18 or minimizing the same to little axial play.

In order to be able to tighten the webbing 16 upon activation of the end fitting tensioner 10 a force transmission element 38 is provided for coupling the belt shaft 12 to a tensioner drive 40. In the illustrated embodiment, the force transmission element 38 is a pull rope 41 being partly wound onto the rope reel 36 and secured by one rope end 45 to the rope reel 36.

The tensioner drive 40 of the end fitting tensioner 10 comprises a tensioner tube 42 for receiving and guiding a pressurizing element 44 as well as a separate generator housing 46 for receiving a gas generator 48. The generator housing 46 in the shown embodiment is a tube length so that both the tensioner tube 42 and the generator housing 46 are made of a metal tube, especially a steel tube. Moreover, a coupling element 50 is provided for tightly connecting the generator housing 46 to the tensioner tube 42 (cf. FIG. 1).

According to FIG. 1, the pressurizing element 44 is a piston which is received in the bent tensioner tube 42 to be substantially sealed and to be axially movable along a tube axis. The pull rope 41 secured by the rope end 45 to the rope reel 36 extends from the rope reel 36 into the tensioner tube 42 and is secured there to the piston by an opposite rope end 52. Upon activation of the gas generator 48, gas pressure is applied to the piston and the piston moves in the direction of a free tube end 54 of the tensioner tube 42. While the belt shaft 12 rotates, pull rope 41 is unwound from the rope reel 36 and at the same time webbing 16 is wound onto the belt shaft 12 so that belt tensioning takes place.

In order to reinforce the connection between the tensioner tube 42 and the generator housing 46 as well as to provide a simple connection between the tensioner drive 40 and the belt shaft housing 18, furthermore a stabilizing unit 56 is provided. Said stabilizing unit 56 in the present case comprises two stabilizing elements 58, especially made of zinc die cast, and a fastener 60 in the form of a tubular rivet, for example.

In the present embodiment of the end fitting tensioner 10 the tensioner drive 40, especially the rope reel 36 of the tensioner drive 40, exhibits a particularly advantageous design which shall be discussed in detail hereinafter by way of FIGS. 5 to 9.

Figure 5:
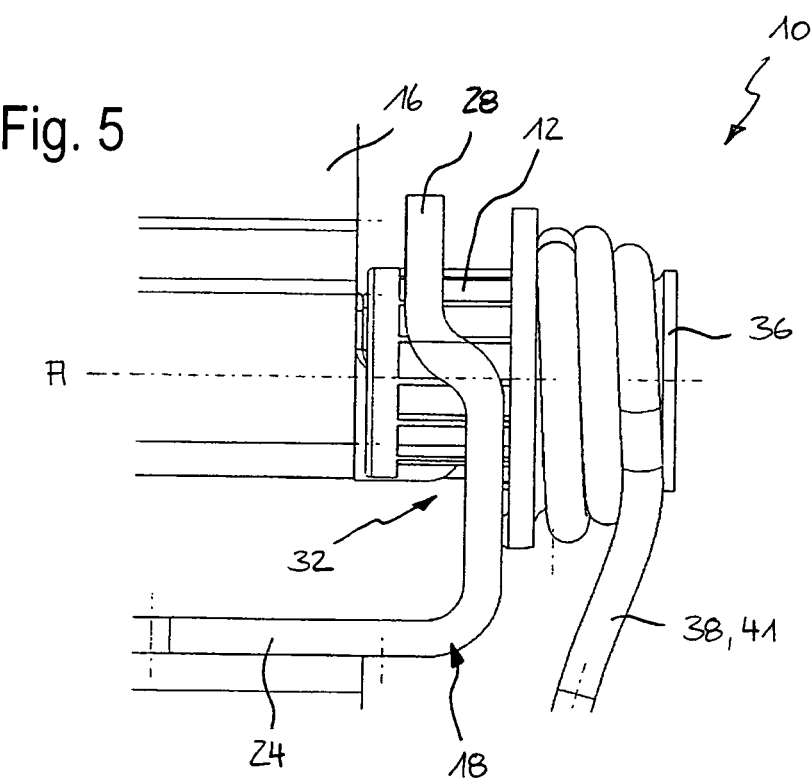
FIG. 5 is a detailed view of the end fitting tensioner according to FIGS. 1 to 4 in the area of a rope reel.
Figure 6:
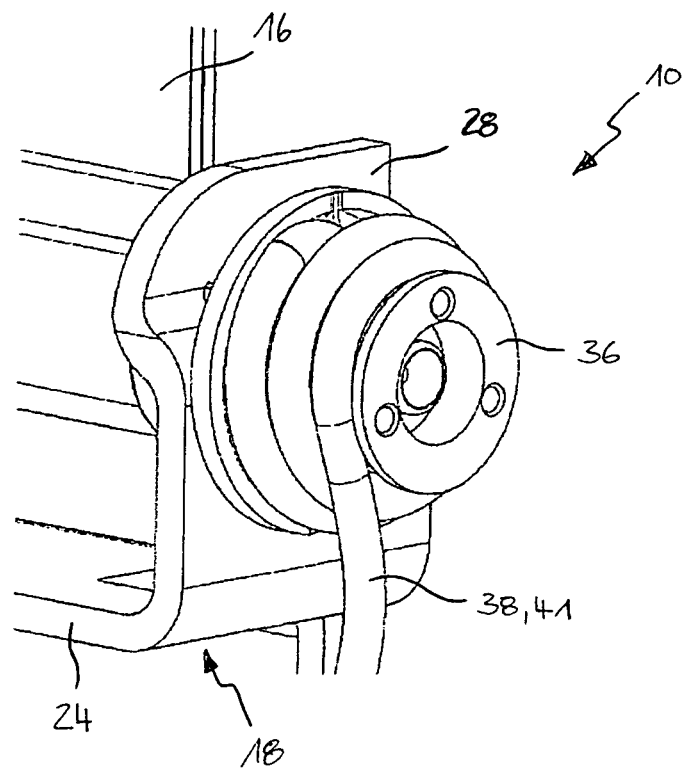
FIG. 6 is another detailed view of the end fitting tensioner according to FIGS. 1 to 4 in the area of the rope reel.

FIGS. 5 and 6 show detailed views of the end fitting tensioner 10 in the area of the rope reel 36, the rope reel 36 being arranged at an axial end of the belt shaft 12 and being connected to the belt shaft 12 in a rotationally fixed manner. The pull rope 41 extends from a first rope end 45 secured to the rope reel 36 via plural windings on the rope reel 36 into the tensioner tube 42 to an opposite second rope end 52 secured to the pressurizing element 44 (cf. also FIG. 1).

Figure 7:
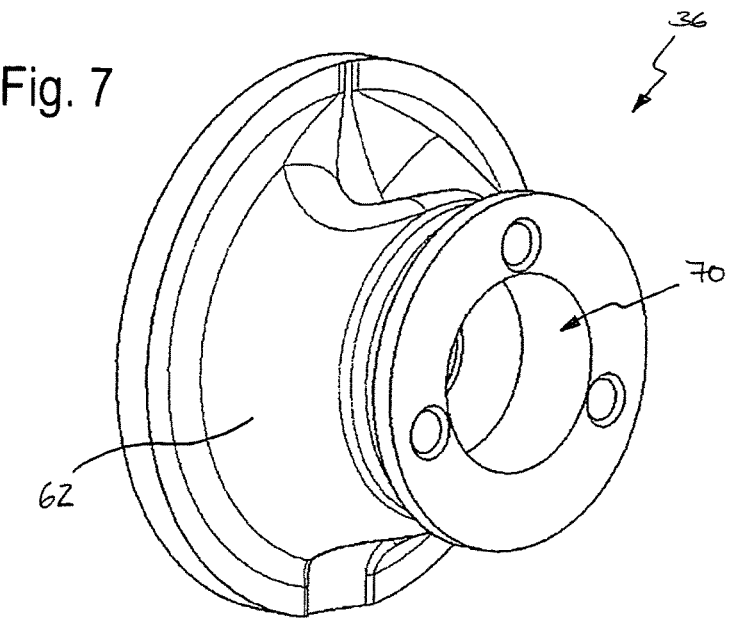
FIG. 7 is another detailed view of a rope reel for the end fitting tensioner according to FIGS. 1 to 4.
Figures 8, 9:
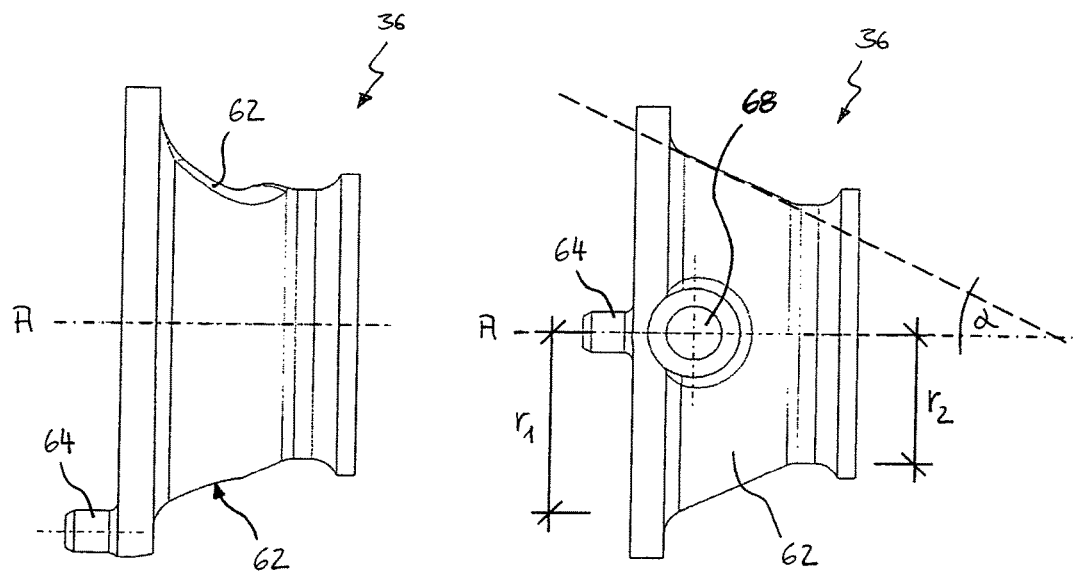
FIG. 8 is a side view of the rope reel according to FIG. 7.
FIG. 9 is a bottom view of the rope reel according to FIG. 7.

Each of FIGS. 7 to 9 shows a detailed view of the rope reel 36 without wound pull rope 41. It is evident here that the rope reel 36 has a winding surface 62 for the pull rope 41 which is conically tapered in the axial direction. In the present case the winding surface 62 substantially corresponds to the shell surface of a truncated cone, wherein it can be adjusted by way of a cone angle α in which way the ratio between the tensioning force and the webbing retraction path is to develop in the course of the tensioning operation.

As an alternative, it is also imaginable, however, that the winding surface 62 in the axial direction has a curvature, wherein the ratio between the tensioning force and the webbing retraction path in that case is set via the course of curvature.

In order to be able to adapt the shape of the winding surface 62 and of the entire rope reel 36 to the respective marginal conditions of a concrete end fitting tensioner 10 at low costs, the rope reel 36 preferably is a cast part, especially made of zinc die cast.

The rope reel 36 according to FIG. 8 includes a shear element 64 which, prior to activation of the end fitting tensioner 10, positively engages in a corresponding recess 66 of the belt shaft housing 18 (cf. FIG. 1) and prevents relative rotation as well as relative movement between the rope reel 36 and the belt shaft housing 18 directed transversely to the axis A. By the accurately fitting engagement of the shear element 64 in the recess 66 during running no undesired rattling noise will occur between the belt shaft housing 18 and the rope reel 36 and, resp., the belt shaft 12 fixedly connected to the rope reel 36.

Especially preferred, the belt shaft 12 is fixed by the shear element 64 in its locked position relative to the belt shaft housing 18 so that the end 14 of the webbing 16 in a case of restraint of the seat belt system without activation of the end fitting tensioner 10 is advantageously retained at a vehicle seat or a vehicle body largely free from play.

According to FIG. 9, a radius r of the winding surface 62 decreases in the axial direction from a first radius $r_1$ to a smaller second radius $r_2$, the pull rope 41 being fastened in the area of the first radius $r_1$ and being wound onto the rope reel 36 in the direction of the smaller second radius $r_2$ (cf. FIGS. 5 and 6). For securing the pull rope 41 on the rope reel 36 the first rope end 45 is guided through an aperture 68 in the winding surface 62.

In the embodiment according to FIG. 9, the aperture 68 is a bore through which the pull rope 41 is guided radially inwardly into a rope securing space 70 of the rope reel 36. Subsequently, the first rope end 45 is thickened, for example, by a pressed-on sleeve so that it is fastened on the rope reel 36.

FIGS. 10 to 12 show an alternative possibility of securing the first rope end 45 on the rope reel 36.

FIG. 10 illustrates a cutout of the pull rope 41, wherein the first rope end 45 is connected to, especially pressed with a securing ring 72.

FIG. 11 illustrates a perspective view of the rope reel 36 for the end fitting tensioner 10 with the pull rope 41 secured on the rope reel 36 according to FIG. 10. In contrast to the embodiment according to FIG. 9, the radial aperture 68 in the rope reel 36 is not in the form of a bore but of an axial slit which especially facilitates mounting of the first rope end 45 on the rope reel 36.

The securing ring 72 in advance pressed with the first rope end 45 is simply inserted axially into the rope securing space 70 so that the first rope end 45 extends radially outwardly through the slit-like aperture 68, the securing ring 72 being accommodated in an accurately fitting manner in the rope securing space 70 of the rope reel 36 transversely to the axis A (cf. FIG. 12).

After that, the pull rope 41 is wound onto the winding surface 62 of the rope reel 36 and is guided to the tensioner tube 42 where it is secured to the pressurizing element 44 by its second rope end 52.

Upon activating the end fitting tensioner 10, due to the conical design of the winding surface 62 an advantageous belt tensioning is resulting in which the webbing 16 initially being quite loosely in contact with the occupant is at first retracted quickly, i.e. with a webbing retraction path that is long in relation to the piston movement, and with low tensioning force. In the course of the tensioning operation the webbing retraction is decelerated and the tensioning force is increased.

The invention claimed is:

1. An end fitting tensioner for a seat belt system, comprising
    a rotatable belt shaft (12) to which one end (14) of a webbing (16) is fixed,
    a belt shaft housing (18) in which the belt shaft (12) is supported,
    a rope reel (36) which is arranged at an axial end of the belt shaft (12) and is connected to the belt shaft (12), as well as
    a pull rope (41) which is secured by one rope end (45) to the rope reel (36) and can at least partly be wound onto the rope reel (36), a second end of the pull rope opposite the one rope end being secured to a driving element arranged to move along a linear path,
    wherein the rope reel (36) includes a winding surface (62) for the pull rope (41) which is conically tapered in the axial direction.

2. The end fitting tensioner according to claim 1, wherein the rope reel (36) is a cast part.

3. The end fitting tensioner according to claim 1, wherein a radius of the winding surface (62) is reduced in the axial direction from a first radius ($r_1$) to a smaller second radius ($r_2$), wherein the pull rope (41) is secured in the area of the first radius ($r_1$) and is wound onto the rope reel (36) in the direction of the smaller second radius ($r_2$).

4. The end fitting tensioner according to claim 3, wherein the winding surface is linear between the first end and the second end of the rope reel in a direction along the longitudinal axis of the belt shaft.

5. The end fitting tensioner according to claim 3, wherein the winding surface is curved between the first end and the second end of the rope reel in a direction along the longitudinal axis of the belt shaft.

6. The end fitting tensioner according to claim 1, wherein the driving element includes a tensioner tube (42) for receiving and guiding a pressurizing element (44), the pull rope (41) extending from a first rope end (45) secured to the rope reel (36) via at least one winding on the rope reel (36) into the tensioner tube (42) to the second rope end (52) secured on the pressurizing element (44).

7. The end fitting tensioner according to claim 1, wherein the rope reel (36) and/or the belt shaft housing (18) includes a shear element (64) which, prior to activation of the end fitting tensioner (10), positively engages in a corresponding recess (66) of the belt shaft housing (18) and/or of the rope reel (36) and prevents relative rotation between the rope reel (36) and the belt shaft housing (18).

8. The end fitting tensioner according to claim 1 further comprising a pressurizing element guided by a tensioner tube, the second rope end of the pull rope being secured to the pressurizing element.

9. An end fitting tensioner for a seat belt system, the end fitting tensioner comprising:
    a belt shaft housing;
    a belt shaft supported by the belt shaft housing for rotation about a longitudinal axis of the belt shaft and attached to one end of a webbing;
    a rope reel non-rotatably connected to an axial end of the belt shaft and having a winding surface that is conically tapered along the longitudinal axis of the belt shaft; and
    a pull rope having a first rope end and a second rope end opposite the first rope end, the first rope end being secured to the rope reel and being wound onto the winding surface, the second rope end being secured to a driving element arranged to move along a linear path, the pull rope being arranged to unwind from the winding surface to cause the webbing to be wound onto the belt shaft upon movement of the driving element.

10. The end fitting tensioner according to claim 9, wherein the conically tapered winding surface has a first radius at a first end of the rope reel and a second radius at a second end of the rope reel opposite the first end, the first radius being larger than the second radius, the pull rope being secured to the rope reel in an area of the first radius and wound onto the winding surface toward the second radius.

11. The end fitting tensioner according to claim 10, wherein the winding surface is linear between the first end and the second end of the rope reel in a direction along the longitudinal axis of the belt shaft.

12. The end fitting tensioner according to claim 10, wherein the winding surface is curved between the first end and the second end of the rope reel in a direction along the longitudinal axis of the belt shaft.

13. The end fitting tensioner according to claim 9, wherein the driving element includes a pressurizing element guided by a tensioner tube, the second rope end of the pull rope being secured to the pressurizing element.

14. The end fitting tensioner according to claim 13 further comprising a gas generator that can be activated to apply pressurized gas to the pressurizing element to move the pressurizing element relative to the tensioner tube, the pull rope unwinding from the winding surface upon relative movement between the pressurizing element and the tensioner tube.

15. The end fitting tensioner according to claim 9, wherein at least one of the rope reel and the belt shaft housing includes a shear element that engages in a recess provided on at least one of the belt shaft housing and the rope reel to prevent relative rotation between the rope reel and the belt shaft housing.

\* \* \* \* \*